Jan. 16, 1968   J. D. CONTI   3,364,091
LAMINATING METHOD AND APPARATUS
Filed Dec. 26, 1962
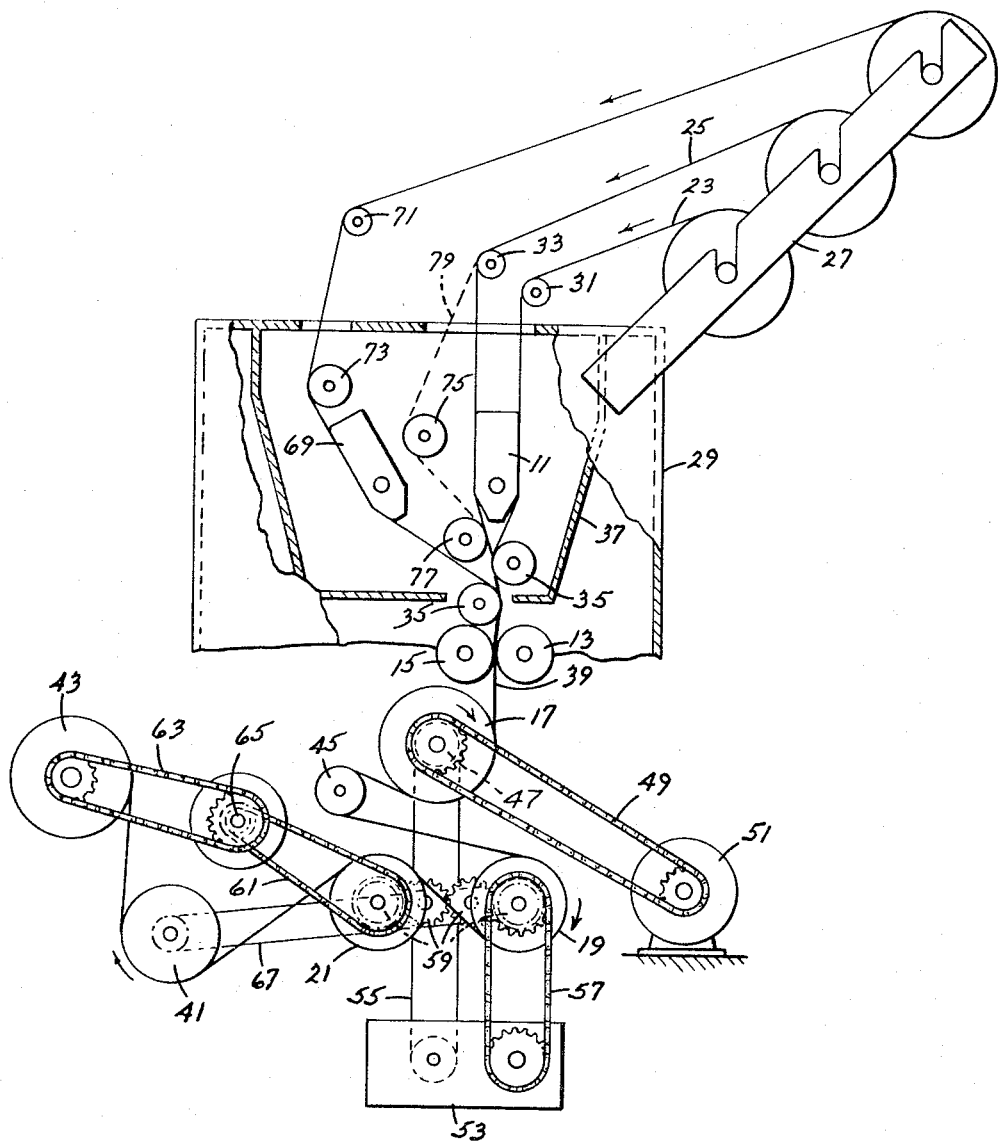

United States Patent Office 3,364,091
Patented Jan. 16, 1968

3,364,091
LAMINATING METHOD AND APPARATUS
John D. Conti, Elkins Park, Pa., assignor, by mesne assignments, to FMC Corporation, San Jose, Calif., a corporation of Delaware
Filed Dec. 26, 1962, Ser. No. 246,932
10 Claims. (Cl. 156—306)

This invention relates to laminating of sheets and continuous films having heat-sealable properties.

In one of the most generally accepted laminating procedures, sheets or films are bonded to each other by being passed between pressure rollers which are heated to such temperature as to render at least the opposed surfaces of the sheets or films tacky. It has been found, however, that under these elevated temperature conditions the exposed surfaces of the combined sheets or films are often damaged, or destroyed when coated films are employed, and that the sheets or films themselves tend to adhere to the pressure rollers. Accordingly, a primary object of this invention is to provide a generally new or improved and more satisfactory method and apparatus for laminating sheets and films.

Another object of the invention is the provision of an improved laminating method and apparatus wherein sheets or films having thermoplastic material on at least one side of opposing sides thereof are heated to render only the surface of such thermoplastic material tacky, afterwhich the sheets or films are bonded to each other under pressure.

Still another object of the invention is the provision of an improved laminating method and apparatus wherein a pair of films are pressed together after at least one of the opposing sides of such sheets or films is heated to render the surface thereof tacky, afterwhich the pressed films are maintained in a heated condition, while under substantially no pressure, and then cooled.

Still further objects will appear from the following description.

These objects are accomplished in accordance with the present invention by a method and apparatus wherein at least one side of opposing sides of a pair of sheets or films is heated to within the softening range of a thermoplastic material forming at least one of such opposing sides, afterwhich the sheets or films are overlapped lightly. Pressure is then applied to the overlapped sheets or films while the thermoplastic material forming such one side is still in a softened condition. The pressed sheets or films are subjected to elevated temperature conditions to maintain the same heated to within the softening range of the thermoplastic material, but preferably below the temperature to which one or both opposing sides of the sheets or films were initially heated. The thus bonded or laminated sheets or films are then cooled and collected.

The method and apparatus of the present invention are particularly useful for laminating continuous transparent coated films and, for the sake of simplicity, are hereafter described as employed for such purpose. The films which are to be laminated in accordance with the present invention preferably include a continuous coating of thermoplastic material on both of the opposing sides thereof. These coated sides of the films are heated directly and rapidly to such a degree as to render only the surfaces thereof tacky and are then overlapped lightly. The overlapped films are advanced between a pair of unheated cooperating pressure rollers to firmly unite the tacky surfaces thereof and then passed around a roll heated to a temperature within the softening range of the thermoplastic coating material but not greater than, and preferably below, the temperature to which the coated sides were initially heated. These laminated films are cooled as by being passed about one or more chill rolls and then collected.

Of particular importance in the practice of the method of the present invention is that heat is initially applied directly and only to the opposing coated sides of the films. This procedure, of course, avoids damage to the exposed sides of the films and eliminates any tendency for the films to adhere to pressure rollers or other parts of the apparatus with which they are subsequently engaged. More important, the application of heat directly to the opposing sides of the films facilitates fusion or softening of only the surfaces of such coated sides, a condition which is necessary for avoiding the introduction of haze or loss of clarity when transparent films, such as coated regenerated cellulose films, are being laminated.

Maintaining the films heated after they have been pressed, as indicated above, is also essential, for satisfactory results, especially when transparent films are being processed. Insufficient heating of the pressed films at this stage generally leads to a poor bond between the films. Alternatively, heating of the films to temperatures greater than their initial heating often causes excessive fusion of the opposing coated sides of the films which in turn results in loss of transparency and some sacrifice in the strength of the bond between the films.

The method and apparatus of the present invention may be utilized to laminate two continuous films directly to each other or to the opposite sides of a third continuous film. Such third continuous film may be formed of or may be coated on one or both sides with a thermoplastic material. In accordance with the preferred procedure, the third continuous film receives no direct heat and thus may be extremely thin in cross-section.

The method and apparatus of the present invention are adapted for use with a variety of different thermoplastic film and coating materials. For the sake of simplicity and clarity, however, the invention is hereafter described in detail as applied to transparent regenerated cellulose films having opposing sides coated with a copolymer of vinylidene chloride and vinyl chloride (Saran), in which such opposing sides are laminated directly to each other and, alternatively, to the opposite sides of a continuous film of polyethylene.

The single figure of the drawing diagrammatically illustrates the apparatus of the present invention, as well as the paths of the different films during the laminating procedure.

Basically, the apparatus of the present invention includes an electrically heated shoe 11, pressure rollers 13 and 15, a heated roll 17, and a pair of chill rolls 19 and 21. Rolls of continuous films 23 and 25 which are to be laminated are supported between brackets 27 which are fixed to a housing 29. For purposes of description, and as heretofore indicated, the films 23 and 25 each indicate a transparent regenerated cellulose base having a continuous coating of a copolymer of vinylidene chloride and vinyl chloride on at least opposing sides thereof.

The films 23 and 25 are drawn from their respective rolls in such manner that their coated sides are disposed in opposing relationship, passed about guide rods 31 and 33, and engaged with opposite sides of the heating shoe 11. The temperature of the heating shoe 11 is correlated with the speed of the films 23 and 25 so that only the surfaces of coated sides of the films are rendered tacky as the films engage with and move past the shoe. The heated films 23 and 25 are, preferably, overlapped lightly by spaced rolls 35 and are then passed between pressure rollers 13 and 15 to snugly and uniformly join the tacky surfaces thereof. The rolls 35 are not intended to apply pressure to the films 23 and 25, and serve primarily to overlap the films without trapping air therebetween and before the tacky surfaces thereof cool. As illustrated, a heat insulated enclosure 37 may be provided about the heating shoe 11 and the rollers 35 to prevent undesired chilling of these members, as well as the portions of the films being treated at that stage.

Upon emerging from between the pressure rollers 13 and 15, the bonded films or laminated product 39 is led about the heated roll 17 under a relatively weak tension. The roll 17 is heated in a conventional manner by circulating a heated fluid therethrough, and is designed to maintain the bonded films or product 39 at a temperature within the softening range of the film coatings but below the temperature at which the surfaces of such coating were initially rendered tacky. As heretofore indicated, control over the temperature of the roll 17 is critical for a good bond between the laminated films and to preserve film transparency.

The laminated product 39 is cooled as it is advanced about conventional chill rolls 19 and 21, passed about a rubber-surfaced gripping or pull roll 41 and is collected in roll form as shown at 43. A guide rod 45 is positioned as illustrated for wrapping the bonded films about substantial portions of the rolls 17 and 19.

To facilitate continuous advancement of the films 23 and 25 through the apparatus as described, a sprocket 47 is fixed to one end of the roll 17 and is driven by a chain 49 directly from a motor 51. A speed controller 53 is driven from the roll 17 by a chain 55 and in turn serves to drive the roll 19 by a chain 57. Gears 59 transmit rotary motion from the roll 19 to the roll 21 which in turn drives the take-up roll 43 through chains 61 and 63 and shaft 65. The roll 19 serves also to drive the gripping roll 41 through a chain 67.

For purposes of laminating more than two continuous films, the apparatus also includes a second electrically heated shoe 69, which is similar to the shoe 11 in construction and function. In carrying out this particular operation, the coated side of the film 23 is led into contact with the surface of the shoe 11, as in the procedure heretofore described, while the film 25 is now guided by rods 71 and 73 so that the surface of its saran coated side engages with and is rendered tacky by the heated shoe 69. The film which is to be sandwiched in-between the films 23 and 25 is preferably not heated directly and is guided by rods 75 and 77 along a path as indicated at 79. Once the tacky surfaces of the films 21 and 23 are engaged with the opposite surfaces of the third or central film, the films are processed in the same manner as heretofore described.

The following examples are provided to further illustrate the present invention.

Conventional transparent regenerated cellulose films, each being coated on one side with a copolymer of vinylidene chloride and vinyl chloride (Saran), were together laced through the described laminating apparatus, in a manner as illustrated, and with their coated sides in opposing relationship. The apparatus was set in operation with the electrically heated shoe 11 being brought up to a desired temperature of from about 260° to 270° F. as the films approached a speed of about 400 feet per minute.

As the coated sides of the films engaged with and moved relative to the heated shoe 11 at the speed mentioned, only the surfaces of such coated sides were rendered tacky and were rapidly and lightly overlapped with each other by the rollers 35 before any significant cooling was experienced. The pressure rollers 13 and 15 were positioned so as to snugly press the still tacky surfaces of the overlapped films together without deforming the films or the fused portions of their coatings. The bonded portions of films leaving the pressure rollers were passed, under a very light tension, about the roll 17 which was kept heated to a temperature of about 230° F. by circulating a heat transfer medium therethrough.

Upon leaving the roll 17, the now fully laminated product was cooled by rolls 19 and 21 which were kept at a temperature of about 60° F., also by circulating a heat transfer medium therethrough. In the resulting laminated product, a uniform, strong and continuous bond was found to exist between the films and no haze or loss of film clarity was apparent.

When the temperature of the heated shoe 11 was increased while holding the speed of the films constant, excessive fusion of the coated sides of the films resulted, with the finished laminated product being hazy and exhibiting a poor bond between the adjacent films. On the other hand, when the temperature of the shoe 11 was reduced so as to effect little or no fusion of the coated sides of the films, lamination of the films could not be achieved. As expected, corresponding results were obtained by holding the temperature of the shoe constant while the speed of the film was reduced and increased substantially from the value noted above.

Additionally, it was found that increasing the temperature of the roll 17 provided results similar to those achieved by elevating the temperature of the shoe itself. Similarly, lowering the temperature of the roll 17 to below the softening range of the material from which the film coatings were made resulted in the establishment of little or only a poor bond between the films.

As a further example, the coated sides of regenerated cellulose films, as described above, were engaged with and advanced at about 400 feet per minute relative to separate shoes 11 and 69 heated to about 260° to 270° F. to thereby render only the surfaces of such coated sides tacky. A continuous unoriented polyethylene film, having a thickness of about 1 mil, was directed in-between and adhered to the tacky surfaces of the regenerated cellulose films during their passage toward and over the rolls 35. These sandwiched films were then subjected to the same pressure, heating and cooling treatments as set forth in the previous example. The resulting laminated product exhibited good bonds between the different films, and substantially the same degree of transparency as when the individual films were merely overlapped without being bonded.

It is to be understood that changes and variations may be made without departing from the spirit and scope of the invention as defined in the appended claims.

I claim:

1. A method of laminating a plurality of sheets in which at least one of each pair of opposing sides thereof is formed of thermoplastic material including the steps of applying heat directly to at least one of the opposing sides of each pair of opposing sides to elevate the temperature thereof to within the softening range of the thermoplastic material forming such one side, engaging said heated sides with opposing sides under pressure, removing pressure from the sheets and subjecting the sheets to an elevated temperature not greater than the temperature to which said one side was first heated but within the softening range of said thermoplastic material, thereafter cooling the bonded sheets.

2. A method as defined in claim 1 wherein heat is applied to only those opposed sides which are formed of thermoplastic material to render tacky only the surfaces thereof.

3. A method as defined in claim 1 wherein opposing sides of one pair of sheets are formed of thermoplastic material and wherein only the surfaces of such opposing sides are rendered tacky and bonded to opposite sides of a sheet interposed therebetween.

4. A method of laminating a pair of sheets each having a coating of thermoplastic material on at least one side thereof including the steps of rapidly and directly heating only the surfaces of the thermoplastic coatings to render the same tacky, lightly overlapping the tacky surfaces with each other, bonding the sheets by pressing the same together, removing pressure from the sheets and subjecting the same to a temperature within the softening range of the thermoplastic coatings but below the temperature at which such coating was rendered tacky, and cooling the bonded sheets.

5. A method as defined in claim 4 further including the steps of disposing a separate sheet in-between and in contact with the tacky surfaces of the coated sheets immediately prior to overlapping such coated sheets.

6. A method of laminating continuous films in which at least one of the opposing sides of a pair of films is formed of thermoplastic material including the steps of applying heat directly to at least one of the opposing sides of such pair of spaced, continuously advancing films to render only the surface thereof tacky, lightly overlapping the opposing sides of the films while the surface of the heated side is tacky, pressing the advancing, overlapped films together to bond the same, removing pressure from the bonded films and engaging the same with a smooth surface heated to a temperature within the softening range of the thermoplastic material but not greater than the temperature at which such thermoplastic material was rendered tacky, and cooling the bonded films.

7. A method as defined in claim 6 wherein opposing sides of said films include continuous coatings of thermoplastic material, and wherein heat is applied directly to both of the coated sides to render only the surfaces thereof tacky immediately prior to overlapping of the same.

8. A method as defined in claim 7 further including the step of advancing a separate continuous film in-between and in contact with the tacky surfaces of the coated films as such coated films are urged toward each other and into overlapping relationship.

9. A method of laminating continuous films having a coating of thermoplastic material on opposing sides thereof including the steps of advancing the continuous films and engaging the coated sides thereof with stationary heating means to render only the surfaces of such coated sides tacky, disposing the tacky surfaces of the coated sides of the films in overlapping relationship by passing the same between a series of spaced rollers, pressing the overlapping films together by passing the same between a pair of pressure rollers, passing the pressed films under light tension over a roller heated to within the softening range of the thermoplastic material but below the temperature of said stationary means, and thereafter cooling the film by advancing the same about one or more chilled rolls.

10. Apparatus for laminating continuous films in which at least one of each pair of opposing sides thereof is formed of thermoplastic material including means for continuously advancing the films, stationary means for heating at least one of the opposing sides of each pair of opposing sides of the advancing films to render only the surfaces thereof tacky, means for lightly overlapping the opposing sides of the films, means for pressing the films together, means having a smooth surface engaging with an exposed side of the overlapped films and being heated to within the softening range of the thermoplastic material but not greater than the temperature of said stationary means and means for cooling the overlapped films.

References Cited

UNITED STATES PATENTS

| 2,451,597 | 10/1948 | Wheeler | 156—306 |
| 2,474,896 | 7/1949 | Hauser. | |
| 2,757,711 | 8/1956 | Petry et al. | 156—320 X |
| 2,999,782 | 9/1961 | Justice et al. | 161—247 |
| 3,037,868 | 6/1962 | Rosser. | |

FOREIGN PATENTS

| 227,735 | 4/1959 | Australia. |
| 854,678 | 11/1960 | Great Britain. |

EARL M. BERGERT, *Primary Examiner.*

C. B. COSBY, *Assistant Examiner.*